United States Patent [19]

Bly

[11] 4,178,514
[45] Dec. 11, 1979

[54] SYSTEM FOR GENERATING A DYNAMIC FAR INFRARED IMAGE

[75] Inventor: Vincent T. Bly, Alexandria, Va.

[73] Assignee: The United States of America as represented by the Secretary of the Army, Washington, D.C.

[21] Appl. No.: 900,205

[22] Filed: Apr. 26, 1978

[51] Int. Cl.² .............................................. G01J 1/02
[52] U.S. Cl. .................................... 250/493; 250/495
[58] Field of Search ................... 250/495, 493, 211 R, 250/213 R, 483, 486, 363, 370

[56] References Cited

U.S. PATENT DOCUMENTS

| 3,033,989 | 5/1962 | Kazan | 250/211 R |
| 3,585,390 | 6/1971 | Isikawa et al. | 250/493 |
| 3,735,137 | 5/1973 | Bly | 250/495 |
| 4,058,734 | 11/1977 | Vroombout | 250/495 |

Primary Examiner—Bruce C. Anderson
Attorney, Agent, or Firm—Nathan Edelberg; Milton W. Lee; Aubrey J. Dunn

[57] ABSTRACT

A high-quality dynamic far infrared image is produced by projecting a high-quality visible image onto a unique transducer. The transducer consists of a very thin insulating film (approximately 500 Å) with a thin coating of a good visible light absorber-far infrared emitter such as some metallic blacks.

9 Claims, 3 Drawing Figures

U.S. Patent  Dec. 11, 1979  4,178,514
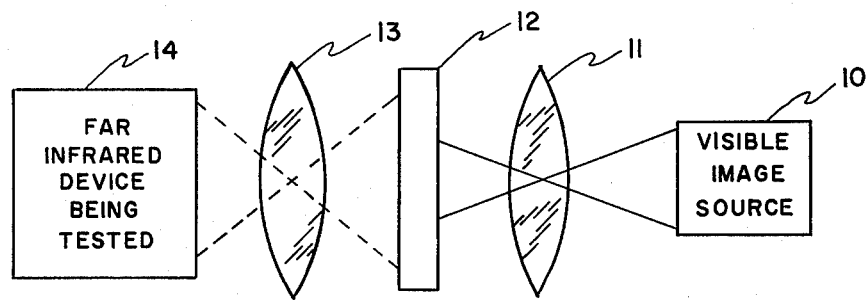
FIG. 1
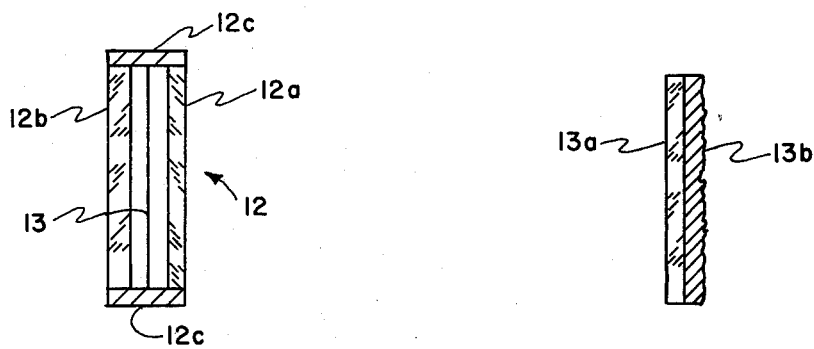 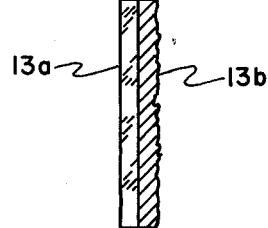
FIG. 2  FIG. 3

SYSTEM FOR GENERATING A DYNAMIC FAR INFRARED IMAGE

The invention described herein may be manufactured, used and licensed by the U.S. Government for governmental purposes without the payment of any royalties thereon.

BACKGROUND OF THE INVENTION

The use of far infrared systems in military applications is continually increasing. These systems include those for visual augmentation such as image intensifiers and those for target detecting and tracking such as heat seeking missiles. Unfortunately, the technology for testing and evalutating such systems is thus far inferior to that available for the visible and near infrared spectrums. For example, there are currently no means for providing a high-resolution, wide field of view, dynamic image in the far infrared spectrum, although various means have been tried. The most promising means has been a passive thin-film visible-to-infrared transducer, but such a transducer has mutually contradictory requirements. Specifically, for best image quality lateral spread of the infrared image must be minimized; this implies a very thin film. Also, a thin film gives high resolution and is able to follow rapid changes in a visible image. However, for mechanical strength, a thick film is required. My invention, as described below is able to resolve these contradictions, and to provide a thin-film transducer capable of providing an infrared image with the desirable characteristics mentioned above.

SUMMARY OF THE INVENTION

The invention is a system for generating a dynamic high-quality far infrared image. The system includes means such as a cinema or video projector for illuminating a unique transducer with a high-quality visible image. The transducer is a good visible light absorber and a good far infrared emitter and thus produces from the visible image a high-quality far infrared image. The far infrared image on the transducer is directed by far infrared optics onto a far infrared device being tested.

BRIEF DESCRIPTON OF THE DRAWINGS

FIG. 1 is a schematic diagram of the invention. FIG. 2 shows a section of the transducer cell of the invention. FIG. 3 shows details of the transducer in the cell of FIG. 2.

DETAILED DESCRIPTION OF THE INVENTION

The invention may perhaps be best understood by referring to the drawings, in which FIG. 1 shows visible image source 10 with lens 11 for focussing an image onto the right side of the transducer in cell 12. This transducer produces a far infrared image of the visible image. The far infrared image is directed by a far infrared lens 13 onto a far infrared device 14 being tested.

Some of the details of transducer cell 12 may be seen in FIG. 2 wherein 12a and 12 b are respectively visible radiation and infrared radiation transparent windows, with transducer 13 between the windows, and with ring 12c supporting all of 12a, 12b, and 13. The space between the windows is at least partially evacuated to limit lateral heat spread and to improve conversion efficiency by eliminating convective losses. Also, since transducer 13 is very thin, a significant mass of trapped gas could cause rupture of the transducer if subjected to shock or vibration.

FIG. 3 shows a cross-section of transducer 13 (not on scale) and includes a very thin insulating film 13a on the order of 500 Å (200–2000 Å) thick. This film may be made from one of the following materials: cellulose nitrate, polyvinyl alcohol, paralene, polymethyl methacrylate, vinyl formal copolymer (Formvar), polyvinyl chloride, or aluminum oxide. Other materials might be used, if they are good thermal insulators and if they can be made to the required thinness. Carried on 13a is a coating 13b of a material which is both a good visible light absorber and a good far infrared emitter. Such materials include gold black, silver black, bismuth black, and platinum black. Coating 13b may have a density on the order of $80 \times 10^{-6}$ gm/cm$^2$ ($30-150 \times 10^{-6}$ gm/cm$^2$). Since the transducer is so thin, and since it is in a vacuum, lateral heat spread of the infrared image is limited. Also, the thinness of the film implies a small heat capacity and a consequent fast time response. Briefly, the principle of operation of the transducer is as follows: visible light impinging on the transducer is locally absorbed and causes a local rise in temperature of the transducer; this temperature rise causes a reemission of radiation in the infrared. An infrared image proportional to the incident visible image is thus formed.

While a specific embodiment of the invention has been shown and described, other embodiments within the scope of the invention may be obvious to one skilled in the art. For example, the windows of the transducer cell may be slanted to eliminate Narsisis effects. Although only dynamic images have been heretofore mentioned, obviously static images may be used with the invention. A static visible image may be provided by photographic slide projector or the like, with a fixed visible light or with a scanning laser. Also, ring 12c of the transducer cell may be made of more than one concentric or coaxial rings, depending on how 13 is formed. Moreover, the transducer cell may be mounted adjacent to the faceplate of a crt, with fiber optics between the faceplate or phosphor of the crt and the cell, thus providing proximity focussing of a video image onto the transducer.

Methods by which the thin film for the transducer may be prepared are well known in the art. In the case of celluose nitrate, the film may be produced by dropping an amyle acetate-ethyl acetate solution of cellulose nitrate onto a water-ethyl alcohol surface and picking up the film with a ring. The metalic black coating may be deposited onto the film by known methods, such as evaporation in a soft vacuum.

I claim:

1. A system for converting a visible image to an infrared image including:
    a visible-to-infrared transducer comprised of a thin thermally insulating film coated with a thin black coating, and means for directing a visible image onto said transducer;
    wherein said film is chosen from one of the group comprising: cellulose nitrate, polyvinyl alcohol, paralene, polymethyl metharcylate, vinyl formal copolymer, polyvinyl chloride, and aluminum oxide.

2. The system as defined in claim 1 wherein said thin film has a thickness on the order of 500 Å.

3. The system as defined in claim 1 wherein said coating has a density on the order of $80 \times 10^{-6}$ gm/cm$^2$.

4. The system as defined in claim 3 wherein said coating is chosen from one of the group comprising: gold black, silver black, bismuth black, and platinum black.

5. The system as defined in claim 2 wherein said coating has a density on the order of $80 \times 10^{-6}$ gm/cm$^2$.

6. The system as defined in claim 5 wherein said coating is chosen from one of the group comprising: gold black, silver black, bismuth black, and platinum black.

7. The system as defined in claim 1 wherein said coating is chosen from one of the group comprising: gold black, silver black, bismuth black, and platinum black.

8. A visible-to-far infrared transducer consisting of a thermally insulating film with a thickness on the order of 500 Å coated with a black coating having a density on the order of $80 \times 10^{-6}$ gm/cm$^2$; wherein said film is chosen from one of the group comprising: cellulose nitrate, polyvinyl alcohol, paralene, polymethyl metharcylate, vinyl formal copolymer, polyvinyl chloride, and aluminum oxide.

9. The transducer as recited in claim 8 wherein said coating is chosen from one of the groups comprising: gold black, silver black, bismuth black, and platinum black.

* * * * *